United States Patent
Shapiro

(10) Patent No.: US 10,325,091 B2
(45) Date of Patent: Jun. 18, 2019

(54) GENERATION OF SECURE PASSWORDS IN REAL-TIME USING PERSONAL DATA

(71) Applicant: International Business Machines Corporation, Armonk, NY (US)

(72) Inventor: Eitan Shapiro, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/246,625

(22) Filed: Aug. 25, 2016

(65) Prior Publication Data

US 2018/0060564 A1 Mar. 1, 2018

(51) Int. Cl.
*G06F 21/31* (2013.01)
*G06F 21/46* (2013.01)

(52) U.S. Cl.
CPC .............. *G06F 21/46* (2013.01); *G06F 21/31* (2013.01)

(58) Field of Classification Search
CPC ................................ G06F 21/46; G06F 21/31
See application file for complete search history.

(56) References Cited

U.S. PATENT DOCUMENTS

| | | | | |
|---|---|---|---|---|
| 6,061,799 | A * | 5/2000 | Eldridge | H04L 9/3226 726/20 |
| 8,332,918 | B2 * | 12/2012 | Vedula | G06F 21/46 713/182 |
| 8,689,001 | B1 | 4/2014 | Satish et al. | |
| 9,218,481 | B2 | 12/2015 | Belisario et al. | |
| 2011/0083172 | A1 | 4/2011 | Heim et al. | |
| 2012/0198530 | A1 * | 8/2012 | Bodavula | G06F 21/31 726/6 |
| 2013/0333010 | A1 * | 12/2013 | Chougle | G06F 21/46 726/7 |
| 2014/0317711 | A1 | 10/2014 | Lee | |
| 2014/0373088 | A1 * | 12/2014 | Aggarwal | G06F 21/46 726/1 |
| 2015/0143509 | A1 * | 5/2015 | Selander | G06F 21/36 726/18 |
| 2015/0269369 | A1 * | 9/2015 | Hamid | G06F 21/31 726/5 |
| 2016/0283709 | A1 * | 9/2016 | Potnuru | G06F 21/36 |

OTHER PUBLICATIONS

Eugene H. Spafford, "Preventing Weak Password Choices", Computer Science Technical Reports; Report No. 91-028, 1991, 12 pages. URL: http://docs.lib.purdue.edu/cgi/viewcontent.cgi?article=1874&context=cstech.

Configuring Password Policy Rules URL: https://selfhelp.bpglobal.com/QPM/Common/Help/en-US/UG_configuring_pass_policies_Body.10.5.htm.

* cited by examiner

*Primary Examiner* — Mohammed Waliullah

(74) *Attorney, Agent, or Firm* — Barry Blount

(57) ABSTRACT

An example system includes a processor to receive personal data including passwords and personal information associated with a user. The processor is to also compute patterns for the passwords based on the personal data. The processor is to further receive a plurality of characters for a proposed password. The processor is to also detect that the proposed password is unsecure based on the personal data and the computed patterns. The processor is to generate a secure password in real-time based on the personal data and the proposed password.

20 Claims, 7 Drawing Sheets

100

GENERATION OF SECURE PASSWORDS IN REAL-TIME USING PERSONAL DATA

BACKGROUND

The present techniques relate to generating secure passwords. More specifically, the techniques relate to generating secure passwords using personal data.

SUMMARY

According to an embodiment described herein, a system can include a processor to receive personal data including passwords and personal information associated with a user. The processor can also further compute patterns for the passwords based on the personal data. The processor can also receive a plurality of characters for a proposed password. The processor can further detect that the proposed password is unsecure based on the personal data and the computed patterns. The processor can further also generate a secure password in real-time based on the personal data and the proposed password.

According to another embodiment described herein, a method can include receiving, via a processor, personal data including passwords and personal information associated with a user. The method can also further include computing, via the processor, patterns for the passwords based on the personal data. The method can also include receiving, via the processor, a plurality of characters for a proposed password. The method can further include detecting, via the processor, that the proposed password is unsecure based on the personal data and the computed patterns. The method can also further include generating, via the processor, a secure password in real-time based on the personal data and the proposed password.

According to another embodiment described herein, a computer program product for can include computer-readable storage medium having program code embodied therewith. The computer readable storage medium is not a transitory signal per se. The program code is executable by a processor to cause the processor to receive personal data including passwords and personal information associated with a user. The program code can also cause the processor to compute patterns for the passwords based on the personal data. The program code can also cause the processor to receive a plurality of characters for a proposed password. The program code can also cause the processor to also further detect that the proposed password is unsecure based on the personal data and the computed patterns. The program code can also cause the processor to generate a secure password in real-time based on the personal data and the proposed password. The program code can further cause the processor to display an indication that the proposed password is unsecure and the secure password. The program code can also cause the processor to receive a selection of the secure password or an edit to the proposed password.

DETAILED DESCRIPTION

Figure 1:
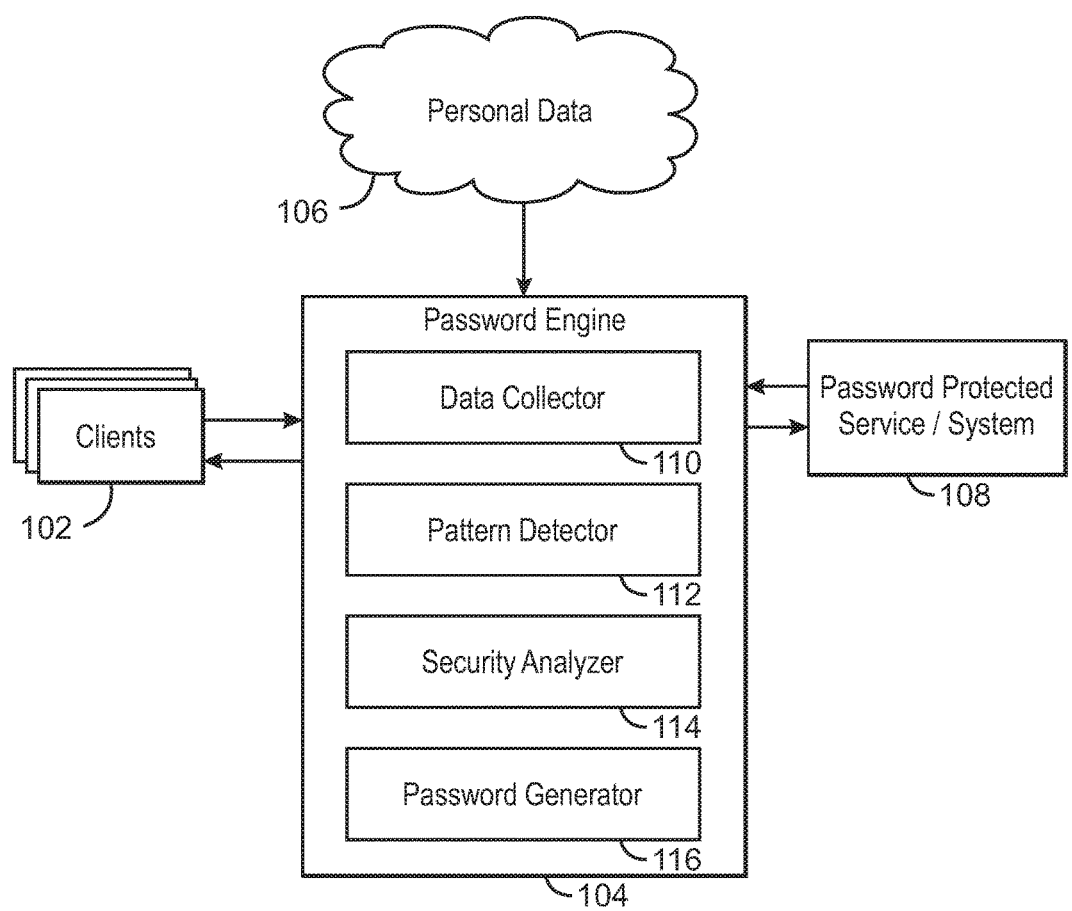
FIG. 1 is a block diagram of an example system that can generate secure passwords using personal data.

Security is a major concern in today's era of social applications in the enterprise and social media worlds, particularly with connectivity for users being available everywhere through cloud and mobile devices. Security may include the use of passwords to protect user data. When selecting passwords, specific rules may be used to make sure the passwords are hard to determine using malicious software. For example, a minimum number of characters, variety of characters, or other rules may be used to increase the security of a password.

However, human and social aspects of password selection may not always be taken into consideration. For example, in order to remember passwords, users may select letters or numbers from personal data including names of people like their kids or objects like their home address. Personal data, as used herein, includes any personal information associated with a user. Such personal information may be publicly available or may not be publicly available. In some examples, users may provide personal information to be used. Moreover, as people participate today in social media sites, private personal data may be exposed and thus become publicly available, and therefore programs may be written to guess such passwords. In addition, many current password checking systems indicate whether or not a password is secure after a user has finished entering the entire password twice. Such systems may be frustrating to users, especially when the users cannot determine why a password has been determined to be insufficiently secure.

According to embodiments of the present techniques secure passwords may be generated in real-time based on personal data. For example, a processor may receive personal data including passwords and personal information associated with a user. The processor may then compute patterns for passwords based on the personal data. For example, personal data may be personal information that is not publicly available and personal information that is publicly available. In some examples, personal data may include passwords, such as previously and currently used passwords for each user. The processor may also receive a plurality of characters for a proposed password. The processor may then detect that the proposed password is unsecure based on the personal data and the computed patterns. The processor may also generate a secure password in real-time based on the personal data and the proposed password. In some examples, the processor may calculate a security score for the proposed password based on a plurality of characteristics and determine whether the security score exceeds a threshold score. Thus, the security of a proposed password may be determined in real-time as a user is typing the proposed password. Furthermore, secure alternative passwords can be provided to the user based on personal data supplied by the user. Thus, the secure passwords may be easier to remember. In addition, because the feedback is provided to the user in real-time, the user may not be disappointed by an error at the end of the process. Moreover, the user may save time using one of the suggested alternative secure passwords. Thus, the techniques may enable security rules for passwords to be personalized and modified over time. The secure passwords generated may also be easier to remember because they are based on personal data associated with each user.

In some scenarios, the techniques described herein may be implemented in a cloud computing environment. As discussed in more detail below in reference to at least FIGS. 4, 5, and 6, a computing device configured to generate secure passwords based on personal data may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can generate secure passwords using personal data. The system is generally referred to using the reference number 100 and can be implemented at least in part using the computing device 400 of FIG. 4 below.

The example system 100 includes a number of clients 102 communicatively coupled with a password engine 104. For example, the password engine 104 may be a browser plugin, a cloud service, an agent, or any other suitable implementation. The password engine 104 may have access to personal data 106. For example, personal data 106 includes personal information associated with a user that may or may not be publically available. Personal data may also include passwords currently or previously used by users. For example, such personal data 106 may be available over the Internet or any other network. The system 100 also includes a password protected service or system 108. The password protected service or system 108 may be coupled to the password engine 104. The password engine 104 further includes a data collector 110, a pattern detector 112, a security analyzer 114, and a password generator 116.

In the example system 100, one or more of the clients 102 may submit proposed passwords to the password engine 104. For example, a proposed password may be used in connection with the password protected service or system 108. The password engine 104 may then analyze the proposed password and either accept the proposed password for use with the password protected system 108, or generate one or more alternative passwords for use with the password protected service or system 108.

The data collector 110 of the password engine 104 may collect personal data 106. For example, the personal data 106 may include data in social media sites, and may be associated with people that work in the specific enterprise. In some examples, the data collector 110 may collect personal information like kids' names, pets' names, addresses, or phone numbers that are public, among other personal information that is public. In some examples, the data collector 110 may receive prior permission from each user to collect the personal data 106. For example, the data collector 110 may display a notice regarding personal information and associated protection and receive permission to collect such personal information. In some examples, the data collector 110 may receive login information from the user. For example, one or more logins and passwords associated with one or more social media accounts or other services may be received from the user. Thus, the data collector 110 may compile a list of users in an enterprise that have provided permission for personal data collection. For each user, the data collector 110 may then search different public sources for available personal data associated with each user. For example, the personal data 106 may include data from social media sites. In some examples, the data collector 110 may then extract nouns from the personal data 110 using any suitable natural language processing (NLP) techniques. For example, the data collector 110 may include dictionaries for "Names" and "Locations" for use in extracting nouns from collected personal data 106. In some examples, the data collector 110 may then extract entities from the extracted nouns.

In some examples, the data collector 110 may also receive personal data directly from users at clients 102. The personal data may include a list of passwords already used by each user. For example, the passwords may include one or more passwords used for social media sites, or the password protected system 108, among other passwords provided by each user. The passwords may include existing as well as past used passwords used by each person. In some examples, the personal data may also include data such as names of children, pets, spouses, relatives, addresses, etc. In some examples, such data may or may not be publicly accessible. For example, the data collector 110 may ask the user to fill in his personal information and receive personal data from the user. In some examples, the data collector 110 may also display a disclosure that emphasizes that the personal data is only for protecting the end-user and will not be used for other purposes. The data collector 110 can ask user to fill in personal data fields while providing examples for what kind of data it needs. In addition, data collector 110 may provide an emphasis that more important information is personal information that is currently or might possibly be exposed on the public web. For example, exposed information could be personal data that is publicly exposed now or personal data that might be publicly exposed in the future. In some embodiments, the personal data may be deleted after generating the secure passwords as described below.

The pattern detector 112 can compare previous or existing user passwords with collected personal data from the data collector 110 for learning patterns. As used herein, patterns refer to different ways of combining characters from personal data of all users. The pattern detector 112 may learn patterns of password construction from the passwords of all users and the collected personal data for each user. For example, the patterns may be different regular expressions over entity names and combinations with other random characters, such as numbers or other characters. These patterns may then be used to calculate the security score of selected passwords as described below.

In some examples, the pattern detector 112 may be a learning system which can continuously collect personal data to maintain security of passwords over time. In some examples, the pattern detector 112 can generate and manage a map between old and current passwords of each user and personal data that the data collector 110 collected. In some examples, the pattern detector 112 can generate and manage a map between old and current passwords of each user and personal data that users may have provided. Each password can be analyzed and the characteristics of each password compared to the personal data being tracked. For example, such characteristics may include the type of personal data field used by a user to pick letters from. For example, the type of personal data field may can include an address, a phone number, a zip code, name of a spouse, a name of a child, a name of a family member, a name of a friend, a name of a pet, a place of birth, a residence name, a residence location, a friend name, a sports team, a current employer name, a previous employer name, a current school, a previous school, an important year milestone, a graduation date, a birth date, a wedding date, a child birth year, a user name, a pseudonym, an e-mail address, among other types of personal data fields. Another characteristic can include the number of letters used from a personal data field. For example, any number of letters from a person's name or other private data field may be used. An additional characteristic may be the position the letters had in the original personal data field. For example, the letters used may be from the beginning, middle, or end of the personal data field. Yet another characteristic may include the position that letters from a personal data field are used in the password. For example, the letters from the personal data field may be used in the beginning, middle, or end of the password. A further characteristic may include the letters and in what position the letters do not match any personal data that is known to the system, and whether there are letters that match other known patterns in the password. For example, other known patterns may include neighboring letters on a keyboard, among other commonly used patterns.

In some examples, all the passwords and characteristics can also be reversed to allow for the system to know how many passwords were associated with each characteristic. For example, a reversed index can be generated and searched using a search engine. In some examples, the reversed index can also allow the system to manage this data structure easily by indexing any new password with its characteristics. For example, the use of common characteristics may mean a password is less protected or secure. Thus, proposed passwords using common characteristics may have lower security scores.

In some examples, the personal data of all users can be stored in an index that allows the system to perform multiple fast type-ahead. For example, the personal data can be held in prefix and infix structures, in addition to reverse forms. Storing the personal data in different forms can allow the system to match user password letters as they are entered against the different forms of the personal data. In some examples, once the system matches letters against personal data, the system can then perform a fast look-up of the characteristics and, based on this fast look-up, give end-user fast feedback if common patterns are found that should be avoided. In some examples, as the user continues to type, there may be multiple matches over personal data and multiple characteristics and each of these matches may impact the security score and the feedback the system gives the user. If the overall security score is low and thus the password considered not protected well enough, the system will prevent from the user from using the password.

The security analyzer 114 can receive proposed passwords from users and determined whether they are secure. The security analyzer 114 may receive the personal data from the data collector 110 and clients 102. The security analyzer 114 may then match the personal data for a specific user and attempt to build the proposed password from it. In some examples, this process may be performed in real-time, as most of the password is built from the personal data. The security analyzer 114 may thus notify the user in real-time about any security issue, and may advise how to refine the password. For example, the security analyzer 114 may provide which personal data was used and what pattern the system used to build the proposed password. The user may then avoid using such pattern or personal data when submitting an alternative proposed password. In some examples, the security analyzer 114 may indicate specific parts of a password to be changed. For example, the security analyzer 114 may highlight portions of a proposed password related to personal data associated with personal information of the user. In some examples, the security analyzer 114 may provide such feedback while a user is entering a proposed password. For example, as a user types each character of a proposed password, the security analyzer 114 may concurrently determine whether the proposed password as entered is secure. Thus, a user may not need to finish typing a password before the security analyzer 114 performs the techniques. Such "as you type" feedback may provide a better user experience and build trust with users by providing support during password entry.

The password generator 116 may generate secure passwords based on personal data. The password generator 116 may then provide a list of secure passwords for the user to select.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional clients, sources of data, password protected, additional network interfaces, etc.).

Figure 2:
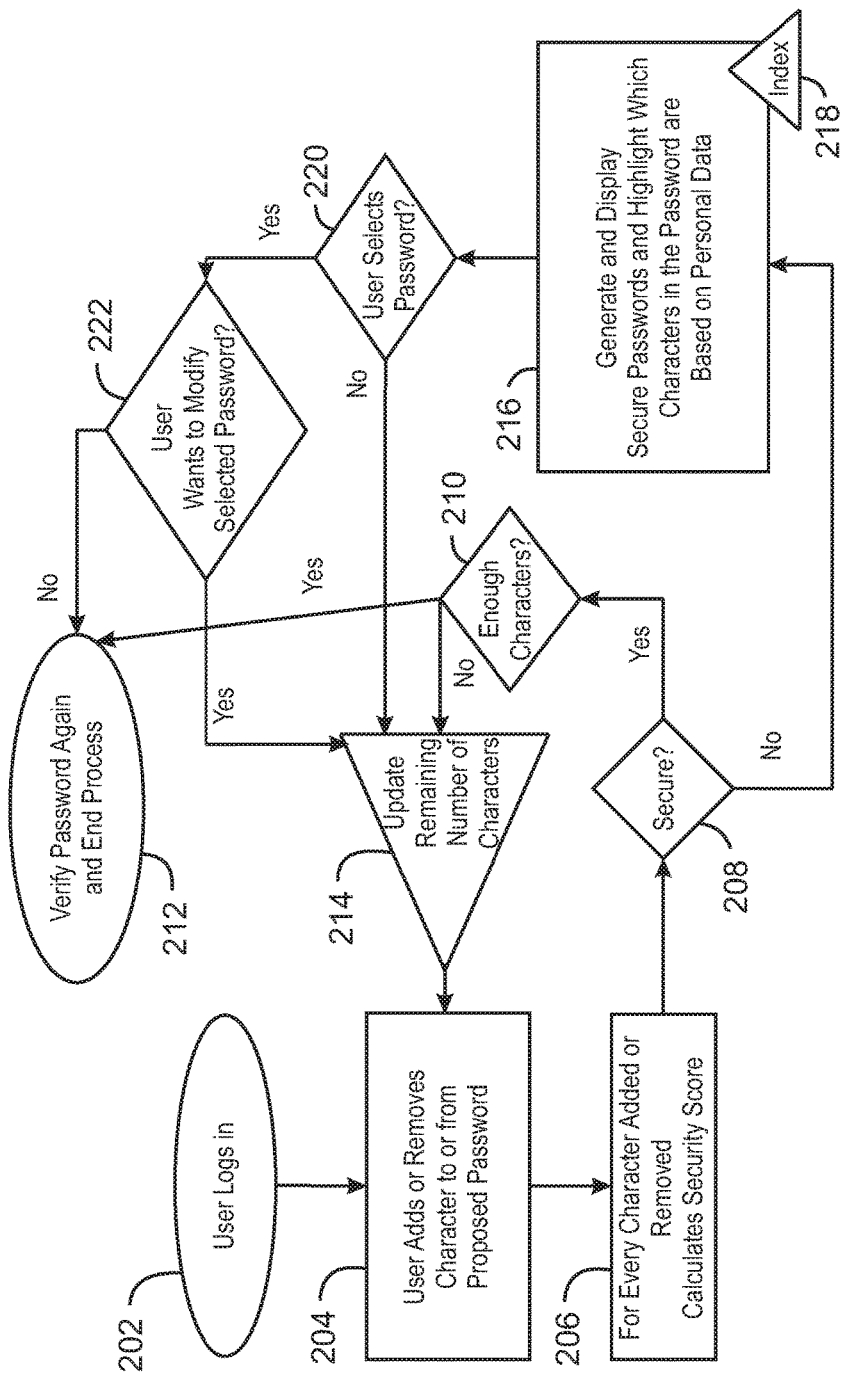
FIG. 2 is a detailed process flow diagram of an example process that can generate secure passwords using personal data in real-time during password input from an end-user.

FIG. 2 is a detailed process flow diagram of an example process that can generate secure passwords using personal data in real-time during password input from an end-user. The process 200 can be implemented with any suitable computing device, such as the computing device 400 of FIG. 4. For example, the process can be implemented at least partially via the processor 402 of computing device 400.

The process 200 may begin at 202, where a user logs into the service or computing device. For example, the user may provide a user name and then be prompted to enter a password. In some examples, the user may be prompted to enter a threshold number of characters, and a threshold number of special characters.

At block 204, the user adds or removes a character to or from a proposed password. In some examples, the system can indicate how many characters are remaining to be typed. For example, the system may initially indicate a predetermined number of default characters to type, and then update the number of characters remaining for each character entered or removed. In some examples, the number of characters remaining to be typed may depend on the present characters that have already been typed for the proposed password.

At block 206, the processor calculates a security score of the proposed password in response to each additional character added to the proposed password or each removed character from the proposed password. For example, the security score may be based on total number of characters, matched patterns, or any of the characteristics discussed with respect to FIG. 1 above. Passwords with larger numbers of characters and less patterns may receive higher security scores.

At diamond 208, the processor determines whether the proposed password is secure. For example, if the security score of the proposed password exceeds a predetermined threshold security score, then the processor may determine that the proposed password is secure. If the proposed password is determined to be secure, then the process may proceed at diamond 210. If the proposed password is determined to not be secure, then the process may proceed at block 216.

At diamond 210, the processor determines whether there are enough characters in the proposed password. For example, the processor may determine whether the number of characters in the proposed password exceeds a predetermined threshold number of characters. If the processor determines that the number of characters is enough, then the process may proceed to circle 212. If the processor determines that the number of characters is not enough, then the process may proceed at triangle 214.

At circle 212, the process ends by verifying the password again and accepting the proposed password. In some examples, if the verification fails, then the process may continue at block 204 again.

At triangle 214, the process continues by updating the remaining number of characters. For example, if not enough characters are detected at diamond 210, then the remaining number of characters to be entered may be updated and displayed at triangle 214. The process may then continue at block 204 with the updated remaining number of characters.

At block 216, if the process determines that the proposed password is not secure, then the processor may generate and display a list of secure passwords and highlights the characters in the secure passwords that are based on personal data. For example, a portion of a secure password may be based on the name of a family member. The portion of the password associated with the family member name may be highlighted when presented to the user in the list. In some examples, a search index 218 may be used to improve look up speed. For example, the search index 218 may include all possible prefixes associated with personal data for a very efficient look up over possible infixes for a password. Thus, the search index 218 may enable real-time generation of a list of secure passwords while a user is entering or removing characters for a proposed password. The process may then proceed to diamond 220.

At diamond 220, the processor determines whether a password has been selected by the user. If the user has selected a password, then the process may continue at diamond 222. If the user has not selected a password, then the process may continue at triangle 214.

At diamond 222, the processor determines whether the user wants to modify the selected password. For example, a user may select a secure password from the list of secure passwords, but may want to make additional modifications to the secure password so that the selected password may be remembered more easily. If the processor determines that the user wants to modify the selected password, then the process may proceed at triangle 214. If the processor determines that the user does not want to make any modifications to the selected password, then the process may proceed to and end at circle 212.

Figure 3:
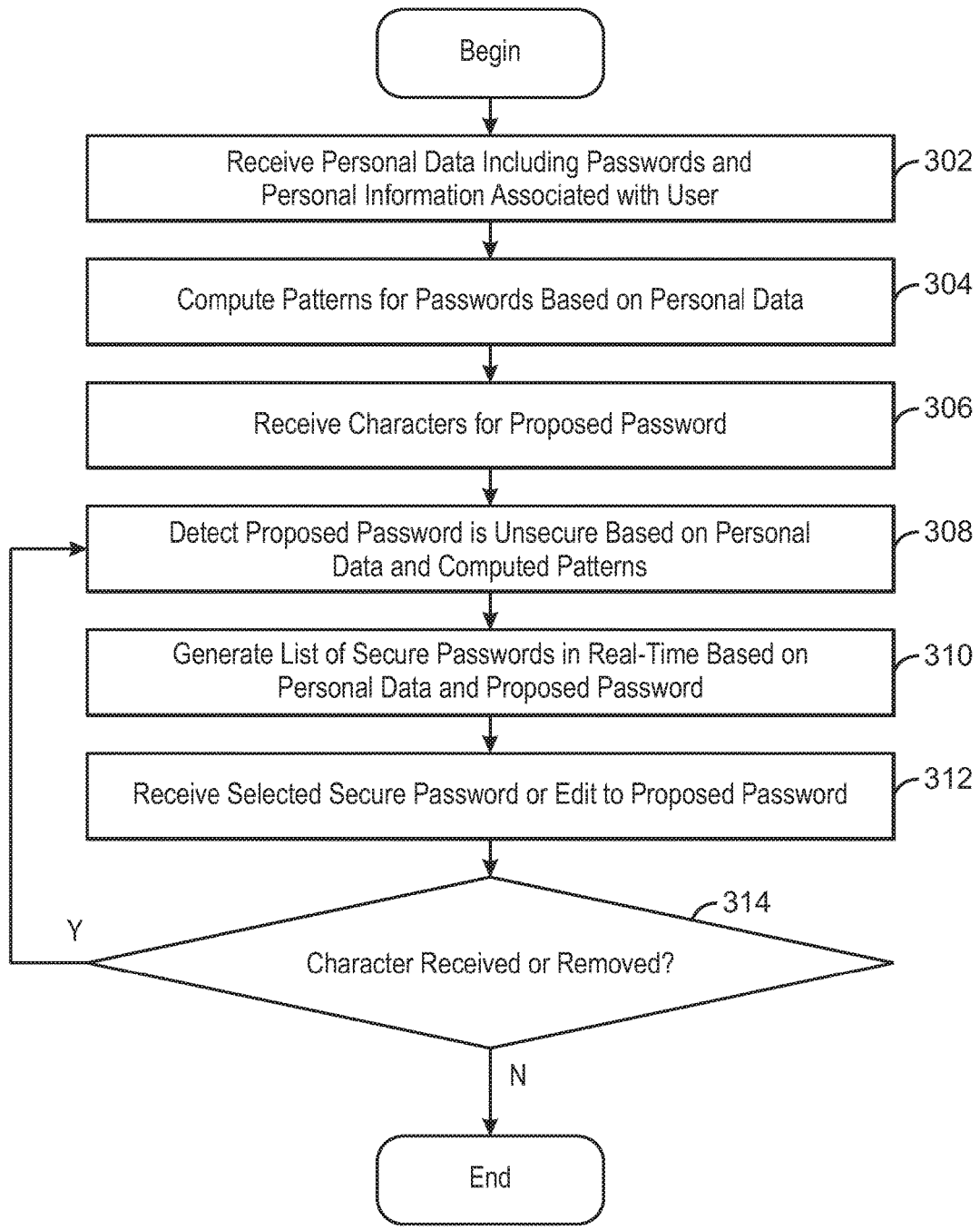
FIG. 3 is a process flow diagram of an example method that can generate secure passwords using personal data.

FIG. 3 is a process flow diagram of an example method that can generate secure passwords. The method 300 can be implemented with any suitable computing device, such as the computing device 400 of FIG. 4. For example, the method can be implemented via the processor 402 of computing device 400.

At block 302, the processor receives personal data including passwords and personal information associated with a user. For example, personal data may include personal information such as names, addresses, or other personal information. In some examples, the personal data may include personal information that may or may not be publicly accessible.

At block 304, the processor computes patterns for the passwords based on the personal data. For example, the processor can match personal data with passwords and compute patterns used in past or current passwords.

At block 306, the processor receives a plurality of characters for a proposed password. For example, the plurality of characters may include letters, numbers, or special characters. In some examples, at least some of the characters may be based on personal data.

At block 308, the processor detects that the proposed password is unsecure based on the personal data and the computed patterns. In some examples, the processor may detect that the proposed password is unsecure based on detected personal data in the proposed password. In some examples, the processor may prompt whether a portion of a proposed password is based on the personal data and receive a confirmation that the portion is based on the personal data. The processor may then calculate a security score based on a plurality of characteristics. The processor can then determine whether the security score exceeds a predetermined threshold score. If the security score does not exceed the predetermined threshold score, then the proposed password may be detected as being unsecure.

At block 310, the processor generates a secure password in real-time based on the personal data and the proposed password. For example, the generated secure password may be displayed to a user in a list of secure password alternatives. In some examples, the processor may also highlight characters in the secure password that are based on personal data. The highlighted portion may help a user remember the password or determine whether the password would be easy to remember or not.

At block 312, the processor receives a selection of the secure password or an edit to the proposed password. In some examples, the processor may determine if a character was received or removed at diamond 314. If the processor detects that a character was received or removed to or from the proposed password, then the method may proceed to block 308, the processor detecting that the proposed password with the additional character is unsecure. The processor may then generate an updated secure password based on the personal data and the proposed password with the additional character, as in block 310 above. In some examples, such a loop may be performed until the proposed password is detected to be secure or no further edits are detected at diamond 314.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
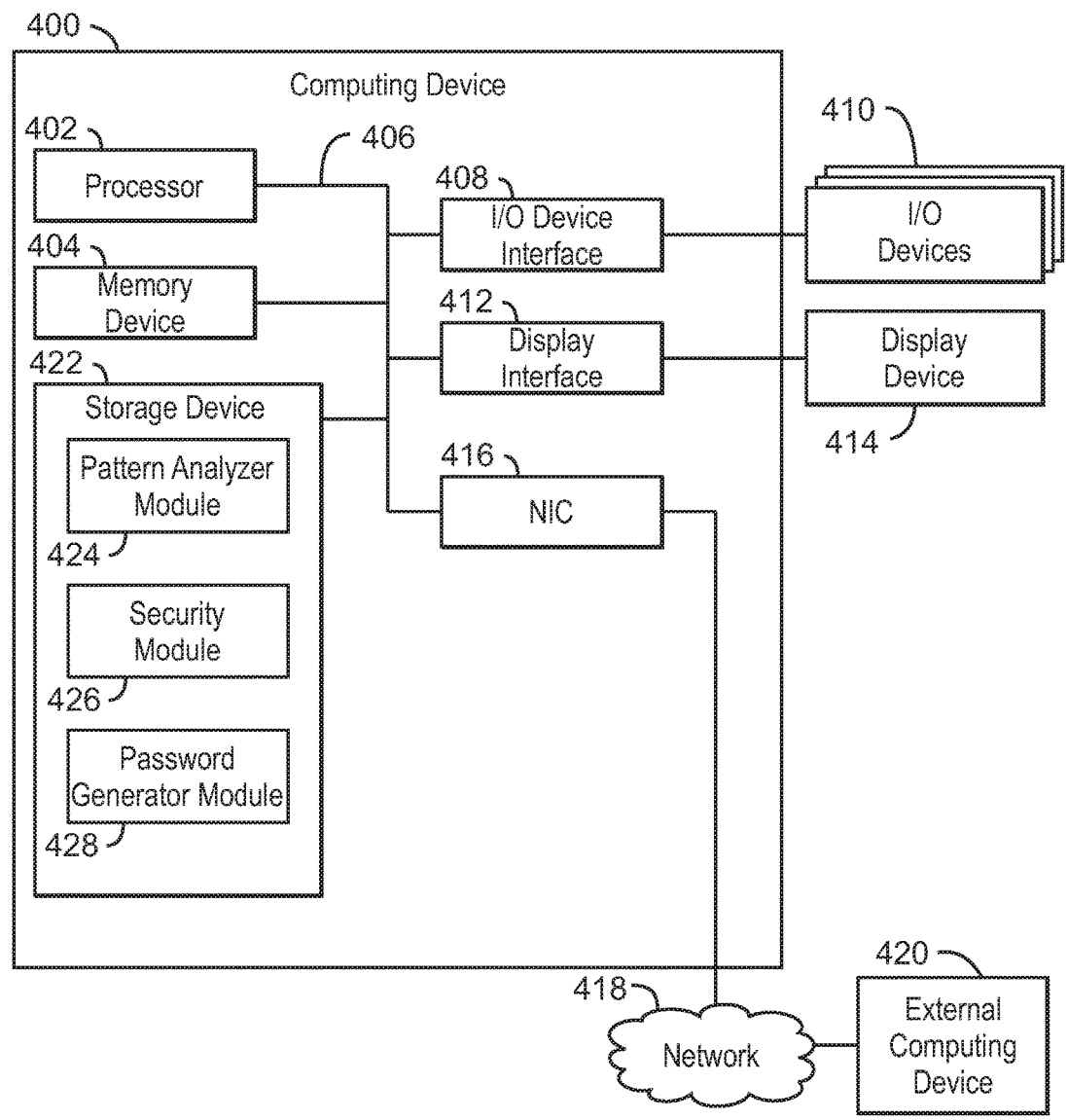
FIG. 4 is a block diagram of an example computing device that can generate secure passwords using personal data.

With reference now to FIG. 4, an example computing device can generate secure passwords using personal data. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external web-server 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a pattern analyzer module 424, a security module 426, and a password generator module 428. The pattern analyzer module 424 can receive personal data including passwords and personal information associated with a user. For example, personal data may include personal information and previously used or presently used passwords. Personal data may include personal information that may or may not be publicly available. For example, the personal data may be accessible via social media sites on the Internet or any other network. The pattern analyzer module 424 can then compute patterns for the passwords based on the personal data.

The security module 426 can receive a plurality of characters for a proposed password. For example, the plurality of characters may be any combination of letters, numbers, or symbols. For example, the plurality of characters may include letters or numbers associated with personal data. The security module 426 can then detect that the proposed password is unsecure based on the personal data and the computed patterns. For example, the security module 426 may calculate a security score based on a plurality of characteristics and determine whether the security score exceeds a predetermined threshold score. In some examples, the security module 426 can detect that the proposed password is unsecure in real-time as each character of the proposed password is received. For example, the security module 426 may determine whether the password is secure after each addition or removal of a character in the proposed password.

The password generator module 428 can generate a secure password in real-time based on the personal data and the proposed password. For example, a list of secure passwords including the secure password can be generated and displayed as a user is entering a proposed password. In some examples, the secure password includes personal data that is highlighted when displayed. In some examples, the secure password may include a number of characters that exceeds a predetermined threshold number of characters and a pattern that does not match the computed patterns. In some examples, the security module 426 may receive a selection of the secure password or an edit to the proposed password. For example, the user may decide that the secure password is easy enough to remember and use the generated secure password. In some examples, the user may instead decide to edit the proposed password to increase the security of a password that may be easier to remember.

In some examples, the security module 426 can receive an additional character for the proposed password. The security module 426 may then detect that the proposed password with the additional character is unsecure. The password generator module 428 may then generate an updated secure password based on the personal data and the proposed password with the additional character. Thus, proposed passwords may be continuously analyzed and secure passwords suggested in real-time as a user types in a proposed password.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the pattern analyzer module 424, the security module 426, the password generator module 428, and the module 430 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the pattern analyzer module 424, the security module 426, and the password generator module 428, can be implemented with logic, wherein the logic, as referred to herein, can include any suitable hardware (e.g., a processor, among others), software (e.g., an application, among others), firmware, or any suitable combination of hardware, software, and firmware.

Figure 5:
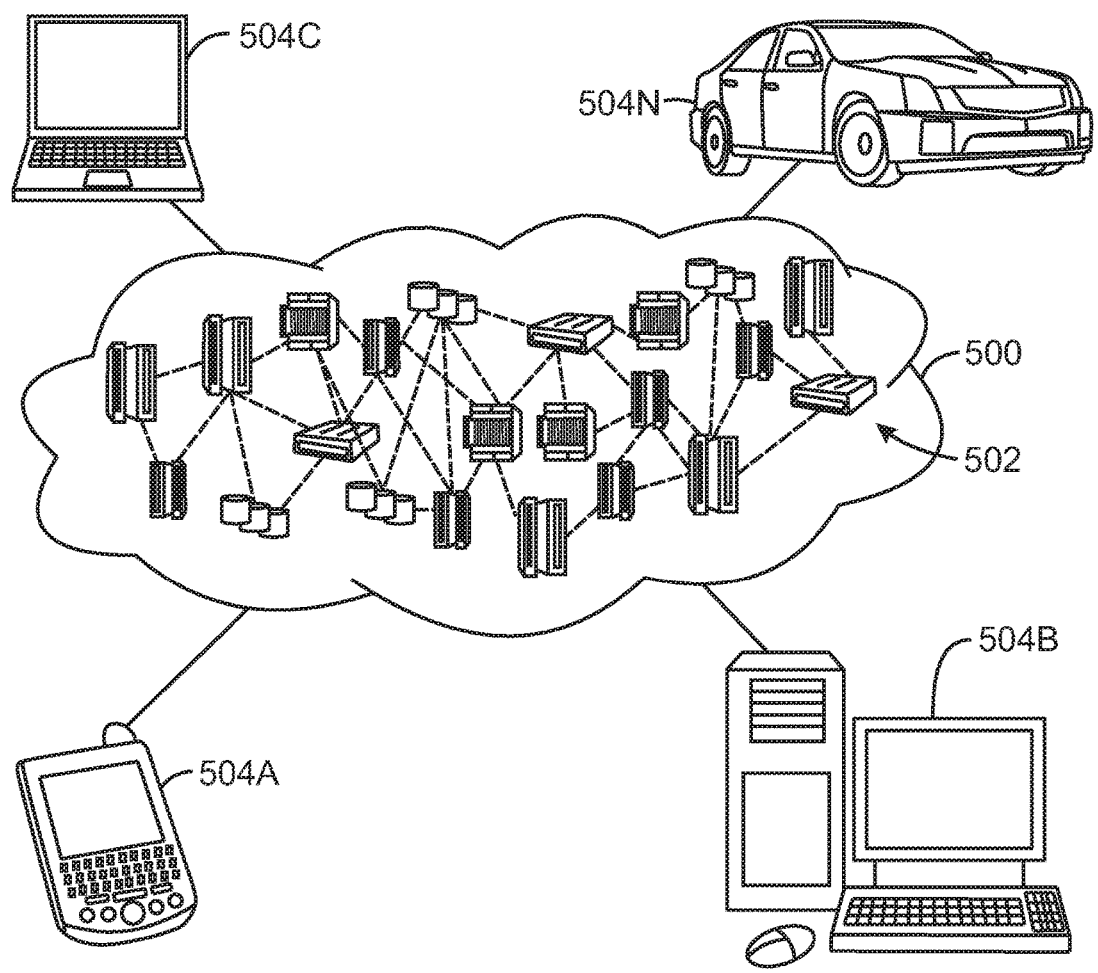
FIG. 5 is a block diagram of an example cloud computing environment according to embodiments described herein.

Referring now to FIG. 5, an illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
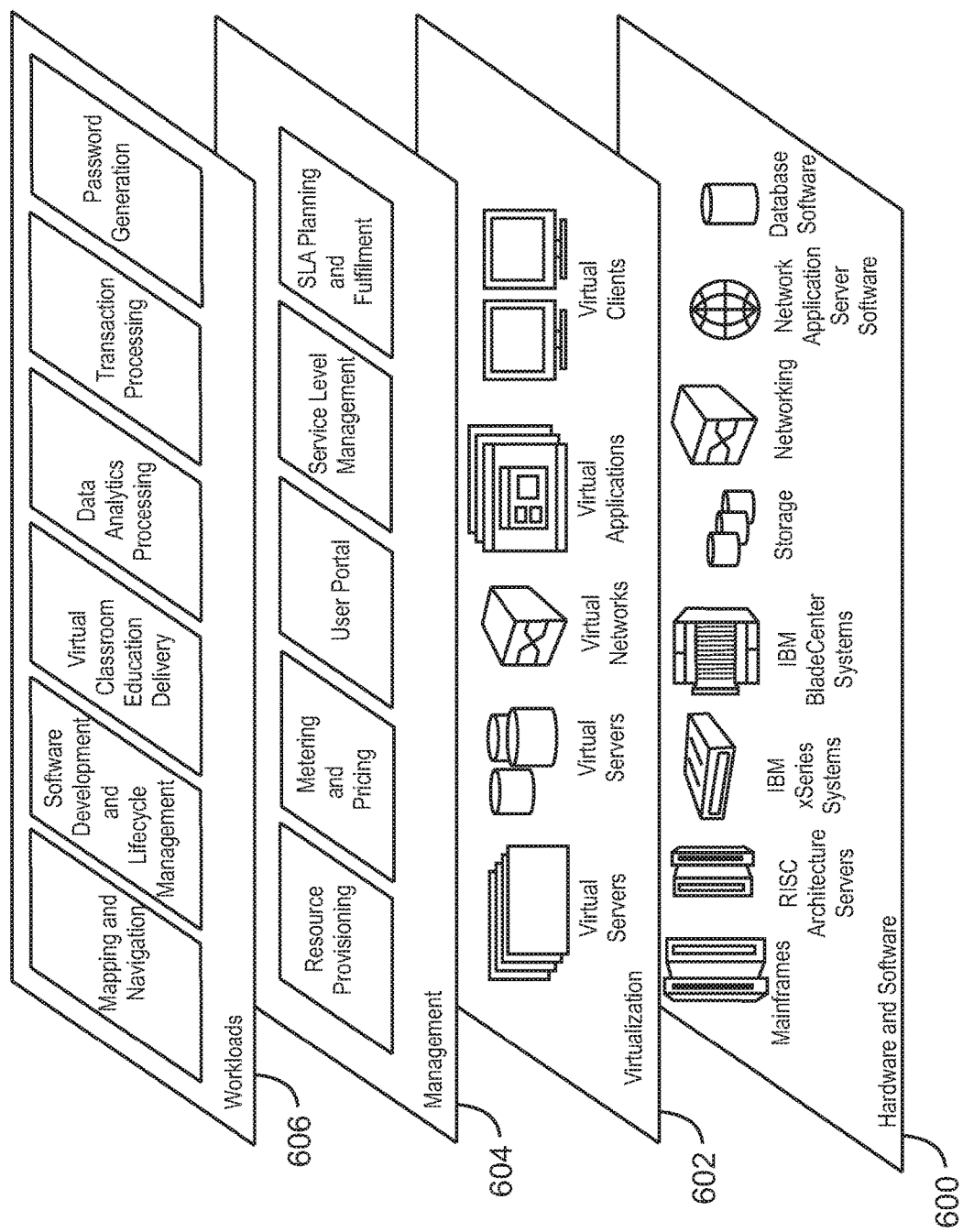
FIG. 6 is an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and password generation.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
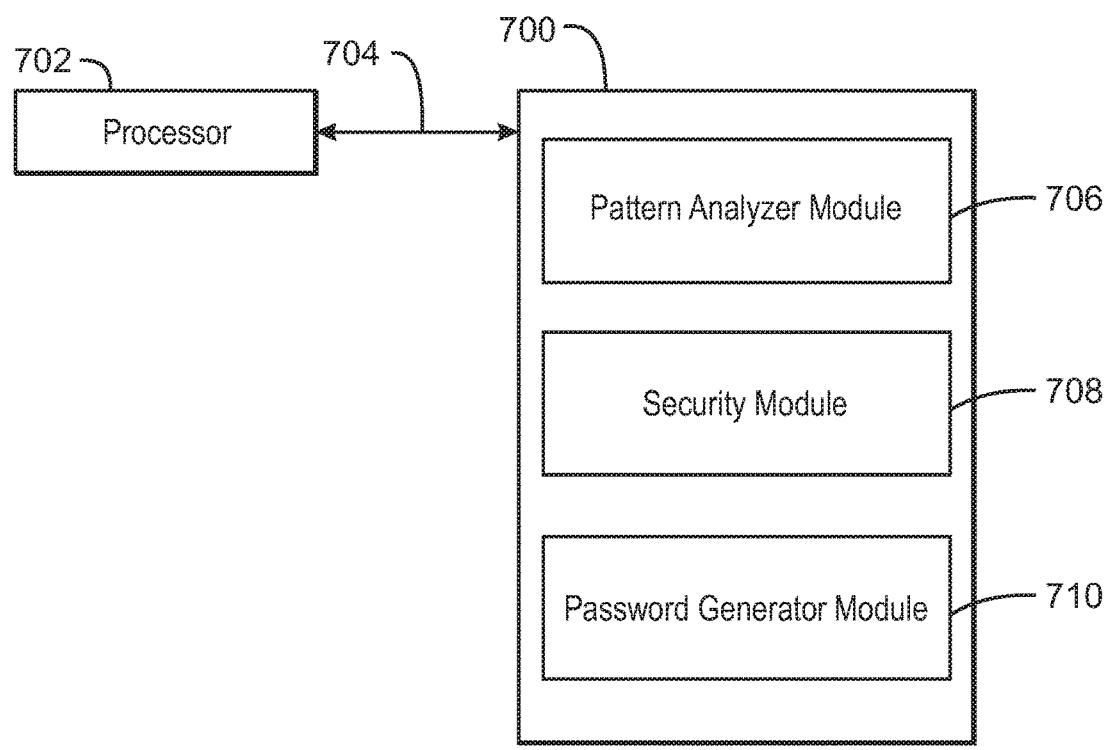
FIG. 7 is an example tangible, non-transitory computer-readable medium that can generate secure passwords using personal data.

Referring now to FIG. 7, a block diagram is depicted of an example tangible, non-transitory computer-readable medium 700 that can generate secure passwords using personal data. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3 above.

The various software components discussed herein may be stored on the tangible, non-transitory, computer-readable medium 700, as indicated in FIG. 7. For example, a pattern analyzer module 706 includes code to receive personal data including passwords and personal information associated with a user. For example, the passwords can include previously used passwords and currently used passwords for the user. The pattern analyzer module 706 also includes code to compute patterns for the passwords based on the personal data. A security module 708 includes code to receive a plurality of characters for a proposed password. The security module 708 includes code to detect that the proposed password is unsecure based on the personal data and the computed patterns. In some examples, the security module 708 may include code to detect that the proposed password is unsecure and display the indication and the secure password in real-time. For example, the security module 708 may include code to calculate a security score for the proposed password and detect that the security score does not exceed a predetermined threshold score. A password generator module 710 includes code to generate a secure password in real-time based on the personal data and the proposed password. The password generator module 710 also includes code to display an indication that the proposed password is unsecure and to display the secure password. In some examples, the password generator module 710 may include code to generate a list of secure passwords including the secure password. The security module 708 further includes code to receive a selection of the secure password or an edit to the proposed password. In some examples, the security module 708 may include code to receive an additional character for the proposed password. The security module 708 may include code to detect that the proposed password with the additional character is unsecure. The password generator module 710 may also include code to generate an updated secure password based on the personal data and the proposed password with the additional character. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive personal data comprising a list of previously used and currently used passwords and personal information associated with a user;
compute patterns comprising regular expressions for the previously used and currently used passwords based on a comparison of one or more characteristics of the previously used and currently used passwords with the personal information, wherein the processor is to extract nouns from the personal information and extract entities from the nouns, wherein the regular expressions comprise different regular expressions over the extracted entities combined with other random characters;
receive a plurality of characters for a proposed password for the user;
detect that the proposed password is unsecure based on a calculated security score not exceeding a predetermined threshold security score, wherein the calculated security score is based on a total number of the plurality of characters and a comparison of the plurality of characters with the personal information associated with the user and the computed patterns; and
generate a secure password in real-time based on the personal information associated with the user and the proposed password.

2. The system of claim 1, wherein the processor is to detect that the proposed password is unsecure in real-time as each character of the proposed password is received.

3. The system of claim 1, wherein the secure password comprises the personal information that is highlighted when displayed.

4. The system of claim 1, wherein the processor is to:
receive an additional character for the proposed password;
detect that the proposed password with the additional character is unsecure; and
generate an updated secure password based on the personal information and the proposed password with the additional character.

5. The system of claim 1, wherein the processor is to generate a list of secure passwords including the secure password.

6. The system of claim 1, wherein the secure password comprises a number of characters that exceeds a predetermined threshold number of characters and a pattern that does not match the computed patterns.

7. The system of claim 1, wherein the processor is to receive a selection of the secure password or an edit to the proposed password.

8. A computer-implemented method, comprising:
receiving, via a processor, personal data comprising a list of previously used and currently used passwords and personal information associated with a user;
computing, via the processor, patterns comprising regular expressions for the passwords based on a comparison of one or more characteristics of the previously used and currently used passwords with the personal information, wherein the processor is to extract nouns from the personal information and extract entities from the nouns, wherein the regular expressions comprise different regular expressions over the extracted entities combined with other random characters;

receiving, via the processor, a plurality of characters for a proposed password for the user;

detecting, via the processor, that the proposed password is unsecure based on a calculated security score not exceeding a predetermined threshold security score, wherein the security score is calculated based on a total number of the plurality of characters and a comparison of the plurality of characters with the personal information associated with the user and the computed patterns; and generating, via the processor, a secure password in real-time based on the personal information associated with the user and the proposed password.

9. The computer-implemented method of claim 8, comprising receiving a selection of the secure password or an edit to the proposed password.

10. The computer-implemented method of claim 8, comprising highlighting characters in the secure password associated with personal information.

11. The computer-implemented method of claim 8, comprising
receiving, via the processor, an additional character for the proposed password;
detecting, via the processor, that the proposed password with the additional character is unsecure; and
generating, via the processor, an updated secure password based on the personal information and the proposed password with the additional character.

12. The computer-implemented method of claim 8, comprising prompting whether a portion of a proposed password is based on the personal information and receiving a confirmation that the portion is based on the personal information.

13. The computer-implemented method of claim 8, wherein detecting that the proposed password is unsecure further comprises calculating a security score for the proposed password based on a plurality of characteristics and detecting that the security score does not exceed a predetermined threshold score.

14. The computer-implemented method of claim 8, comprising displaying the generated secure password in a list of secure passwords, wherein characters of each secure password based on the personal information are highlighted.

15. A computer program product for generation of secure passwords, the computer program product comprising a computer-readable storage medium having program code embodied therewith, wherein the computer readable storage medium is not a transitory signal per se, the program code executable by a processor to cause the processor to:
receive personal data comprising a list of previously used and currently used passwords and personal information associated with a user;
compute patterns comprising regular expressions for the previously used and currently used passwords based on a comparison of one or more characteristics of the previously used and currently used passwords with the personal information, wherein the processor is to extract nouns from the personal information and extract entities from the nouns, wherein the regular expressions comprise different regular expressions over the extracted entities combined with other random characters;

receive a plurality of characters for a proposed password for the user;

detect that the proposed password is unsecure based on a calculated security score not exceeding a predetermined threshold security score, wherein the security score is to be calculated based on a total number of the plurality of characters and a comparison of the plurality of characters with the personal information associated with the user and the computed patterns;

generate a secure password in real-time based on the personal information associated with the user and the proposed password;

display an indication that the proposed password is unsecure and display the secure password; and receive a selection of the secure password or an edit to the proposed password.

16. The computer program product of claim 15, comprising program code executable by the processor to detect that the proposed password is unsecure and display the indication and the secure password in real-time.

17. The computer program product of claim 15, comprising program code executable by the processor to:
receive an additional character for the proposed password;
detect that the proposed password with the additional character is unsecure; and
generate an updated secure password based on the personal information and the proposed password with the additional character.

18. The computer program product of claim 15, comprising program code executable by the processor to generate a list of secure passwords including the secure password.

19. The computer program product of claim 15, comprising program code executable by the processor to calculate a security score for the proposed password and detect that the security score does not exceed a predetermined threshold score.

20. The computer program product of claim 15, comprising program code executable by the processor to highlight characters in the secure password that are based on the personal information.

* * * * *